United States Patent
De Jong (10) Patent No.: US 12,460,670 B2
(45) Date of Patent: Nov. 4, 2025

(54) METHOD OF PERFORMING AN OPERATION ON A VESSEL ASSEMBLY, AS WELL AS A VESSEL ASSEMBLY

(71) Applicant: IV-CONSULT B.V., Papendrecht (NL)

(72) Inventor: Ricky De Jong, Papendrecht (NL)

(73) Assignee: IV-CONSULT B.V., Papendrecht (NL)

( * ) Notice: Subject to any disclaimer, the term of this patent is extended or adjusted under 35 U.S.C. 154(b) by 761 days.

(21) Appl. No.: 17/779,039

(22) PCT Filed: Nov. 19, 2020

(86) PCT No.: PCT/NL2020/050725
§ 371 (c)(1),
(2) Date: May 23, 2022

(87) PCT Pub. No.: WO2021/101377
PCT Pub. Date: May 27, 2021

(65) Prior Publication Data
US 2022/0412408 A1 Dec. 29, 2022

(30) Foreign Application Priority Data
Nov. 22, 2019 (NL) ..................... 2024286

(51) Int. Cl.
*F16C 19/36* (2006.01)
*B01F 27/09* (2022.01)
(Continued)

(52) U.S. Cl.
CPC ............ *F16C 19/364* (2013.01); *B01F 27/09* (2022.01); *F16C 35/062* (2013.01); *B01D 2009/0086* (2013.01); *F16C 2300/34* (2013.01)

(58) Field of Classification Search
CPC ............ B01F 27/09; B01D 2009/0086; F16C 35/062; F16C 2300/34
See application file for complete search history.

(56) References Cited

U.S. PATENT DOCUMENTS

| | | | | |
|---|---|---|---|---|
| 1,722,143 | A | * 7/1929 | Hektner | F16C 35/062 29/898.08 |
| 2007/0286018 | A1 | * 12/2007 | Markle | B01F 33/86 366/331 |
| 2015/0226265 | A1 | 8/2015 | Bourgeois et al. | |

FOREIGN PATENT DOCUMENTS

| | | |
|---|---|---|
| JP | S53118955 A | 10/1978 |
| JP | S59161367 A | 9/1984 |

OTHER PUBLICATIONS

International Search report for PCT/NL2020/050725, prepared by the European Patent Office, mailing date Mar. 29, 2021, 3 pages.

* cited by examiner

*Primary Examiner* — Marc C Howell
(74) *Attorney, Agent, or Firm* — Brooks Kushman P.C.

(57) ABSTRACT

A method of performing an operation such as a maintenance operation on a vessel assembly, said vessel assembly having a vessel, such as a crystallizing vessel, a rotor, said rotor including an upright, rotatable shaft, said shaft having a top shaft section extending above a top wall of the vessel, to perform maintenance. The top shaft section includes a first member chosen from a male member and a female member for engaging a device. The device has a top end, and a bottom end. The bottom end includes a complementary second member for the first member. According to the method, the device is connected to the top shaft section of the shaft, the rotor is lifted by lifting the shaft at its top end section using the device, following which the operation is performed.

11 Claims, 8 Drawing Sheets

(51) Int. Cl.
*F16C 35/06* (2006.01)
*B01D 9/00* (2006.01)

METHOD OF PERFORMING AN OPERATION ON A VESSEL ASSEMBLY, AS WELL AS A VESSEL ASSEMBLY

CROSS-REFERENCE TO RELATED APPLICATION

This application is the U.S. national phase of PCT Application No. PCT/NL2020/050725 filed on Nov. 19, 2020, which claims priority to NL Patent Application No. 2024286 filed on Nov. 22, 2019, the disclosures of which are incorporated in their entirety by reference herein.

The present invention relates to a method of performing an operation on a vessel assembly, said vessel assembly comprising
- a vessel, such as a crystallizing vessel, said vessel comprising a top wall, a bottom wall and an upright wall extending from the bottom wall to the top wall, said top wall, bottom wall and upright wall defining a lumen,
- a superstructure on top of the vessel, said superstructure comprising
  - a bearing, said bearing comprising an upper race member, a lower race member and roller bodies between said upper race member and said lower race member, said lower race member being attached to the superstructure, and
  - a locking nut for locking the bearing, said locking nut comprising an inner thread,
- a rotor, said rotor comprising
  - an upright, rotatable shaft, said shaft comprising i) a top shaft section extending above the top wall and ii) a bottom shaft section in said lumen, said top shaft section
    - being provided with said upper race member, allowing the rotor to rotate along a shaft axis of the upright, rotatable shaft in line with the axis of rotation of the bearing, and
    - comprising an outer thread for engaging the inner thread of the locking nut to lock the upper race member at a desired location on the top shaft section;
  and
  - a plurality of rotor elements attached to said bottom shaft section;
wherein the rotor is stopped and the operation is performed.

A method according to the preamble is known in the art. A vessel such as a crystallizing vessel may need maintenance, for example of the bearing or a device located below said bearing such as a seal in the top wall where the shaft enters the lumen. A seal typically is there when it is desired to avoid content in the lumen such as vapour from leaving the vessel or for a component such as water of dust to enter the lumen of the vessel as this may result in contamination of the vessel or the content thereof.

In the industry, such as in the chemical industry, performing an operation such as maintenance on a vessel, may be quite expensive. The longer the operation takes, the higher the cost. This is in particular the case for plants where production comes to a halt due to the vessel requiring to undergo the operation.

The object of the present invention is to reduce the time necessary for performing an operation on a vessel.

To this end, a method according to the preamble is characterized in that the top shaft section comprises at a location above the upper race member a first member chosen from a male member and a female member for engaging a device, said device having
  a top end, and
  a bottom end, said bottom end comprising a complementary second member for engaging the top shaft section, said complementary second member being chosen from a female member and a male member;
wherein
  the device is connected to the top shaft section of the shaft,
  the rotor is lifted by lifting the shaft at its top end section using the device, and
  the locking nut is rotated upwardly along the top shaft section of the rotor,
following which the operation is performed.

Lifting the rotor using the device allows for rotating the locking nut upwards, by removing the weight of the rotor from the bearing. This allows the operation to be performed quickly. The operation may be a repair operation, an upgrade operation or a maintenance operation. Maintenance may involve a cleaning operation, such as cleaning the bearing or a seal. The operation may, for example, involve replacement of roller bodies or the seal.

For a crystallizing vessel, the rotor element of the plurality of rotor elements is an arm provided with a scraper. For a Rotating Disc Contactor (RDC) vessel, the rotor element is a disc.

According to a favourable embodiment, the rotor comprises an element independently chosen from a recess and a protrusion located below the lower race member;
wherein after rotating the locking nut over at least part of the thread upwards, the rotor is lowered and stabilized at a given height using said element.

Thus the weight of the rotor is supported below the location of the lower race member, allowing full maintenance of the bearing, including replacement thereof, for example replacement of the lower race member which in case of a hanging rotor typically bears its full weight. This typically will require removal of the locking nut and optionally of the device.

According to a favourable embodiment, the vessel comprises a seal sealing against the top shaft section, said seal being located above the element.

The seal is there when it is desired to avoid content in the lumen such as vapour from leaving the vessel or for a component such as water of dust to enter the lumen of the vessel as this may result in contamination of the vessel or the content thereof. The seal will allow an operation above the seal to be performed without subjecting personnel to vapour from the vessel.

According to a favourable embodiment, the element is a tapered body tapering away from top end of the top shaft section, said tapered body having a central axis coinciding with the central axis of the shaft, and the vessel comprises a seat for receiving said body, said seat having a central through-opening for the rotatable shaft.

This allows the body to be received in the seat conveniently and assuredly. Also, this automatically centers the rotor using the tapered body. This is very convenient to maintain alignment, for example when replacing the lower race member. This results in a significant saving in time.

According to a favourable embodiment, when in contact, the seat and the tapered body are in an uninterrupted contact in the rotational direction of the rotor.

According to the present invention, to perform the operation, there is no need to remove the contents from the vessel, which is in particular the case for this favourable embodiment. That is because the uninterrupted contact area acts as a seal, which as may be the case helps to prevent vapour from leaving the vessel between the body and the seat and/or a component from entering the vessel. Typically at least one of i) the bottom (196) of the recess and ii) the tapered body will be provided with a resilient ring to ensure the uninterrupted contact area.

In case of the vessel comprising a seal, this preferred embodiment allows an operation to be performed on said seal of the vessel.

According to a favourable embodiment, the device is lifted hydraulically.

Thus the rotor can be lifted and lowered quickly and conveniently.

According to a favourable embodiment, the superstructure provides a mount for a motor, said motor being a motor for rotating the rotor, wherein before the device is connected to the top shaft section the motor is removed, and the device is attached to the shaft and a hydraulic actuator for lifting the rotor hydraulically is mounted to the superstructure.

Thus the method is cheap, making use of the existing superstructure. Typically a motor is bolted to the superstructure and the hydraulic actuator can be attached using the holes for the bolts in the superstructure, directly or indirectly (a support for the hydraulic actuator being attached to the superstructure).

According to a favourable embodiment, after removal of the motor from the mount, a support is mounted to the mount and the device is attached to the shaft using the support.

The support typically will comprise a through-hole that due to the mounting of the support is centrally located above the shaft. The device is inserted via this through-hole so as to conveniently engage the shaft. Typically, a hydraulic jack will be present or placed on the support so as to engage the device and lift the rotor.

According to a favourable embodiment, the first member of the top shaft section and the complementary member of the device are threaded members.

This allows for a quick engagement and removal of the device while allowing the weight of the rotor to be lifted.

Finally, the present invention relates to a vessel assembly, said vessel assembly comprising a vessel, such as a crystallizing vessel, said vessel comprising a top wall, a bottom wall and an upright wall extending from the bottom wall to the top wall, said top wall, bottom wall and upright wall defining a lumen, a superstructure on top of the vessel, said superstructure comprising a bearing, said bearing comprising an upper race member, a lower race member and roller bodies between said upper race member and said lower race member, said lower race member being attached to the superstructure, and a locking nut for locking the bearing, said locking nut comprising an inner thread, a rotor, said rotor comprising an upright, rotatable shaft, said shaft comprising i) a top shaft section extending above the top wall and ii) a bottom shaft section in said lumen, said top shaft section being provided with said upper race member, allowing the rotor to rotate along a shaft axis of the upright, rotatable shaft in line with the axis of rotation of the bearing, and comprising an outer thread for engaging the inner thread of the locking nut to lock the upper race member at a desired location on the top shaft section;

and a plurality of rotor elements attached to said bottom shaft section;

wherein the rotor comprises an element located below the lower race member, wherein the element is a tapered body tapering away from the top end of the top shaft section, said tapered body having a central axis coinciding with the central axis of the shaft, and the vessel comprises a seat for receiving said body, said seat having a central through-opening for the rotatable shaft.

This allows the weight of the rotor to be moved from the bearing to the seat in a method according to the present invention.

According to a favourable embodiment, when in contact, the seat and the tapered body are in an uninterrupted contact over the circumference of the tapered body.

With such a vessel assembly, to perform an operation on the superstructure, there is no need to remove the contents from the vessel. That is because the uninterrupted contact area acts as a seal, which as may be the case helps to prevent vapour from leaving the vessel between the body and the seat and/or a component from entering the vessel.

In case of the vessel assembly comprises a seal, it allows an operation to be performed on said seal of the vessel.

The present invention will now be illustrated with reference to the drawing where

FIG. C shows a cross-sectional detail of a superstructure of the crystallizer of FIG. 1B;

FIG. 3A to FIG. 3I show cross-sectional views of a top of a vessel, demonstrating a method of performing an operation.

Figure 1A:
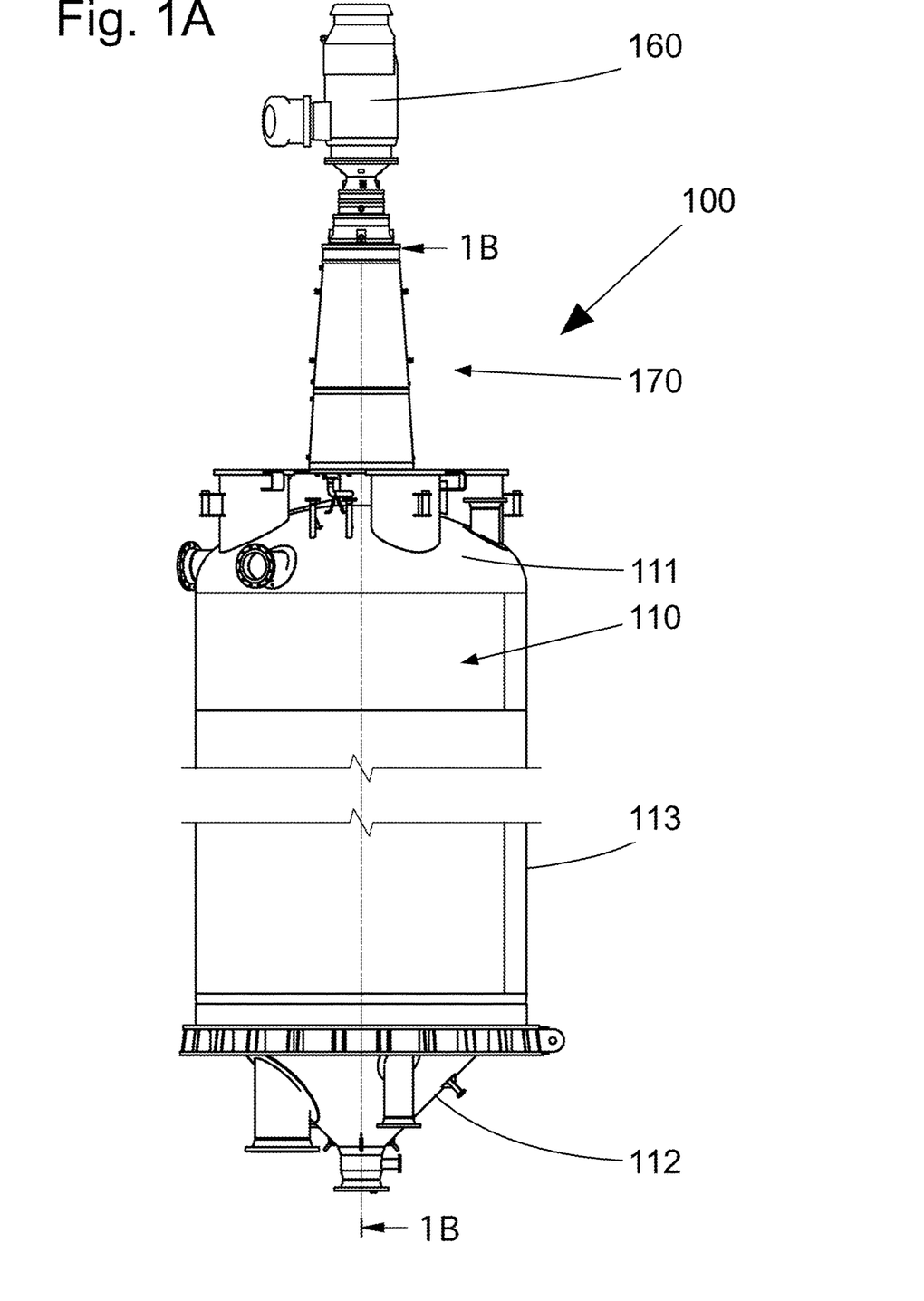
FIG. 1A and FIG. 1B show a side view and a cross-sectional view of a crystallizer.
Figure 1B:
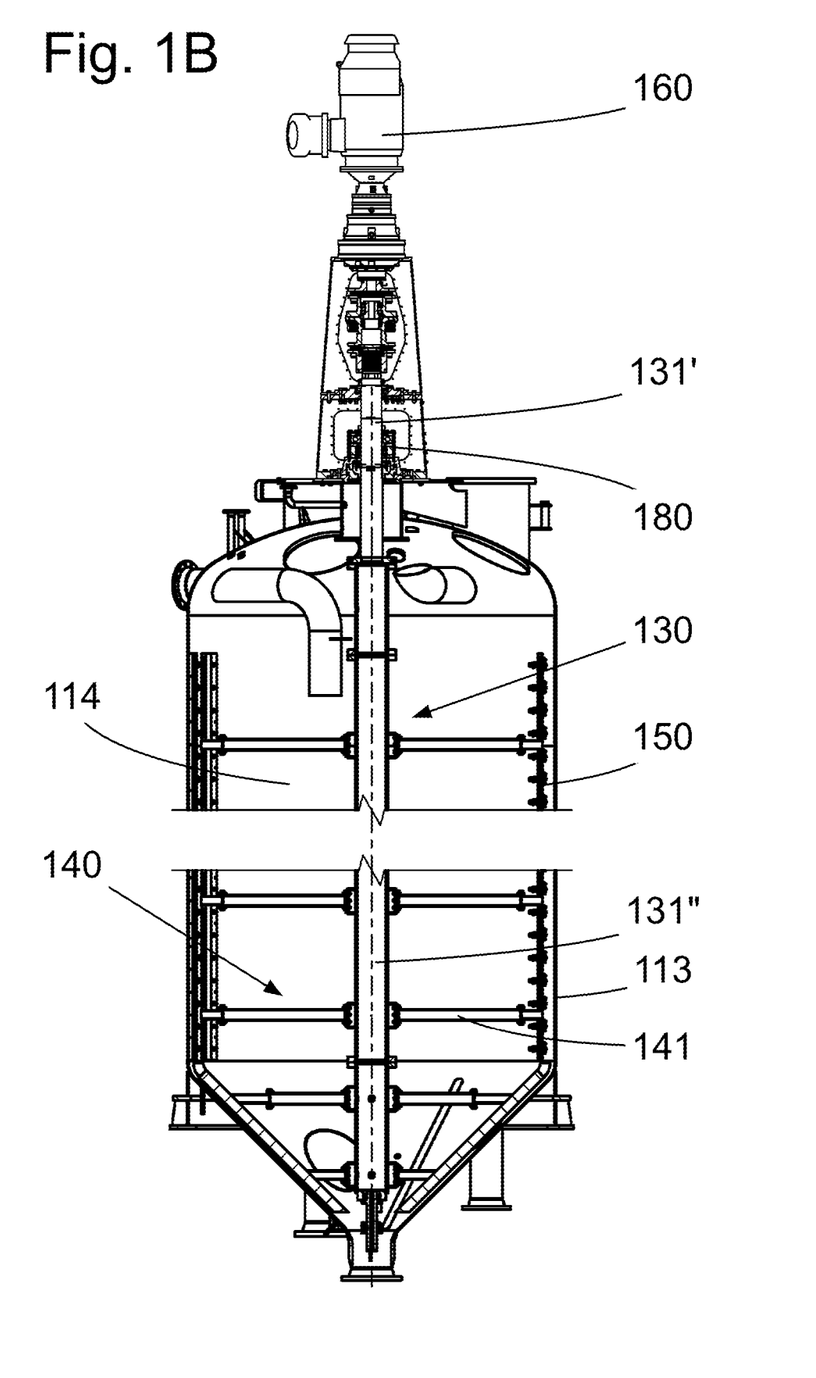

FIG. 1A and FIG. 1B show a side view and a cross-sectional view respectively of a vessel assembly 100, such as a crystallizer 100, said crystallizer 100 comprising a crystallizing vessel 110 comprising a top wall 111, a bottom wall 112 and an upright wall 113 extending from the bottom wall 112 to the top wall 111. The top wall 111, bottom wall 112 and upright wall 113 define a lumen 114 for containing a fluid subjected to crystallisation, such as para-xylene, a compound used for the production of PET.

The crystallizer 100 comprises a rotor 130. The rotor 130 comprises a shaft 131, with a top shaft section 131' extending above the top wall 111 and a bottom shaft section 131" extending in the lumen 114.

The bottom shaft section 131" is provided with a plurality of rotor elements 140. The rotor elements 140 comprise arms 141 provided with scrapers 150. In use, the upright wall 113 will be cooled, causing a component to crystallize against the inside of the upright wall 113. There the crystallized component is scraped from the upright wall 113 and new crystals may form.

On top of the vessel 110 a superstructure 170 is provided.

Figure 1C:
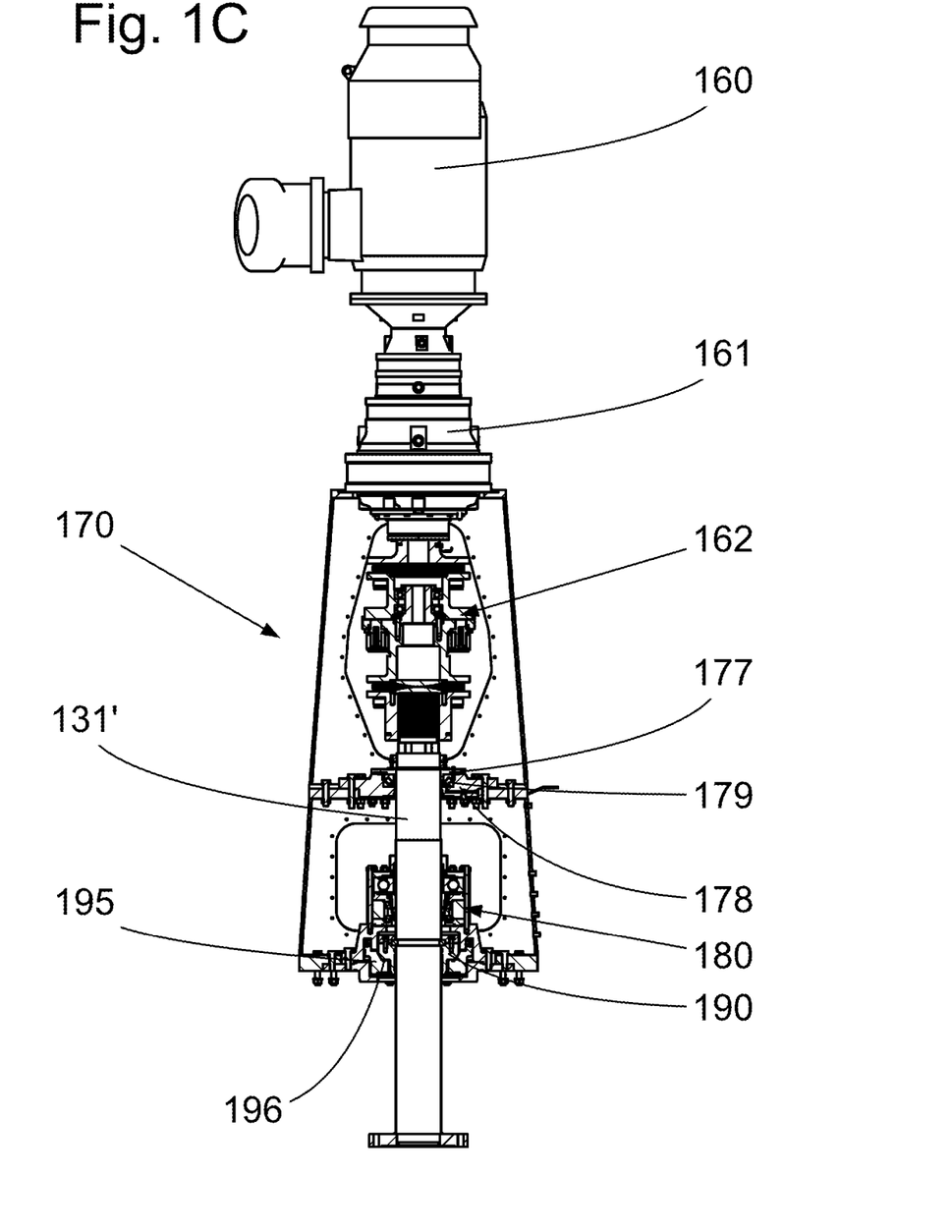

As can be seen in the cross-sectional view of the superstructure FIG. 1C, the superstructure 170 is provided with motor 160 for driving the rotor 130 via a gear box 161 and a torque limiter 162 connected to to the top end of the top shaft section 131'. The torque limiter 162 is provided should the rotor 130 get stuck. A tapered roller bearing 175 is provided to allow the rotor 130 to be suspended from the superstructure 170. A seal 180 is also provided to form a barrier between the lumen 114 and the outside of the vessel 110.

The bearing 175 comprises an upper race member 177 held by the top shaft section 131', a lower race member 178 fixed to the superstructure 170 and roller bodies 179.

Below the seal 180 the top shaft section 131' is provided with a frusto-conically tapered element 190 and the top wall 111 is provided with a seat 195 having a complementary tapered recess 196 for receiving the tapered element 190. When in contact, the contact area of the surface defining the recess 196 and the bottom surface of the frusto-conically tapered element 190 provides for a seal, as will be explained later.

Figure 2:
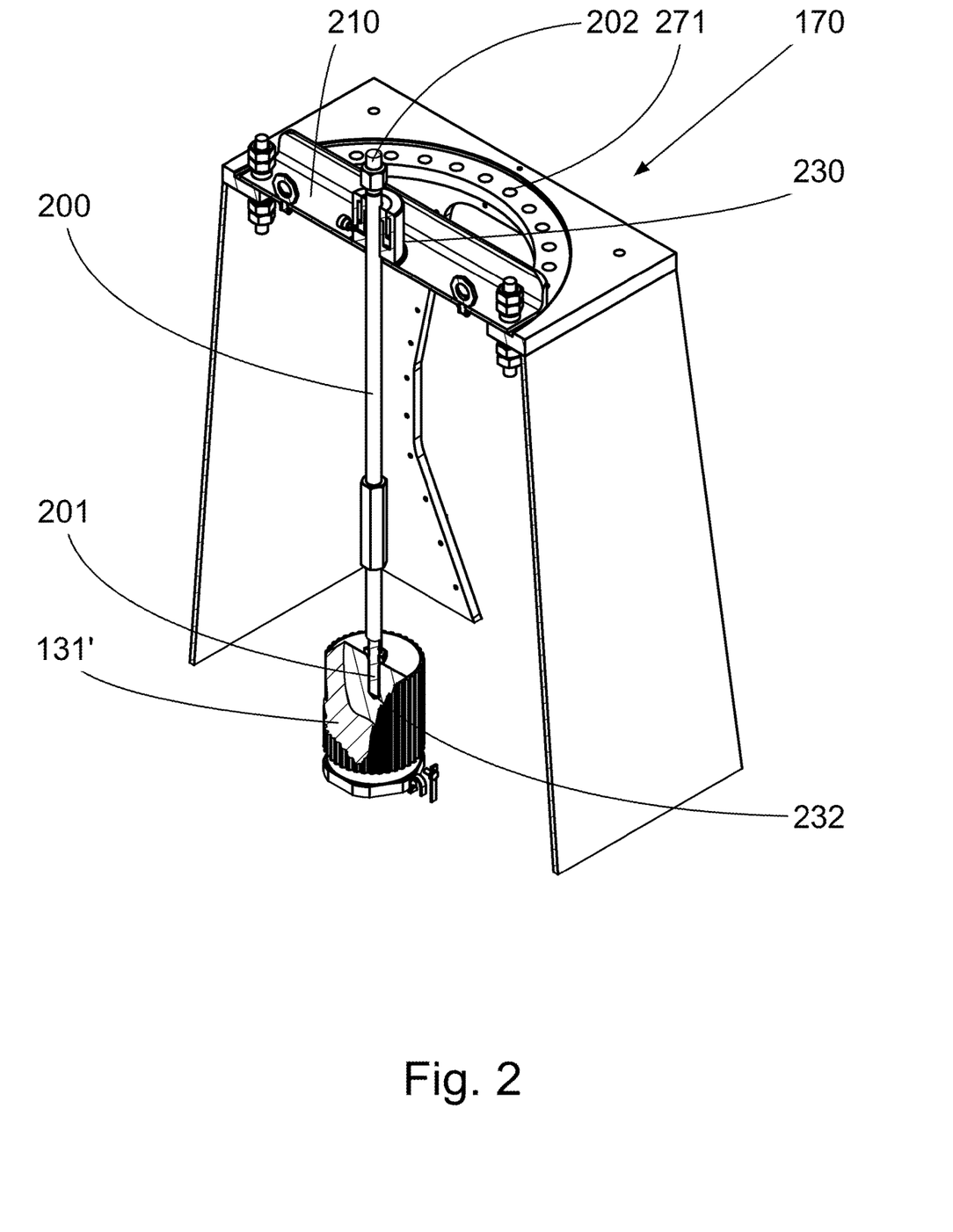
FIG. 2 shows a perspective cross-sectional view of part of a superstructure of the crystallizer of FIG. 1C.

To perform an operation on the vessel assembly 100, the rotor 130 is lifted. This is done using a device 200 which is basically a rod 200. In FIG. 2 perspective cross-sectional view of part of the superstructure 170 is shown. When in use, the motor 160 is mounted to a ring of holes 271 of the superstructure. For performing an operation, the motor 160 and the torque limiter 162 have been removed. They have been replaced by a support bar 210 that is bolted to the superstructure 170 using the same holes 271 normally used for mounting the motor 160.

The device 200 comprises a threaded male distal end 201 that is introduced into a threaded female recess 232 in the top end (shown as a cut out) of the top shaft section 131'.

The support bar 210 is provided with a hydraulic jack 230 engaging the top distal end 202 of the device 200.

FIG. 3A to FIG. 3I show cross-sectional views of a top of a vessel, demonstrating a method of performing an operation on the crystallizer 100 of FIG. 1A.

Figure 3A:
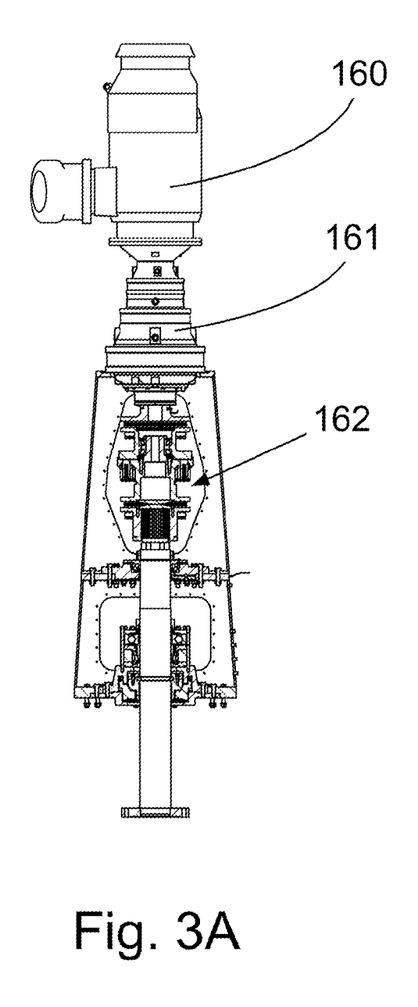

FIG. 3A shows the superstructure 170, provided with the motor 160, the gear box 161, and the torque limiter 162. As a first step, these are removed (FIG. 3B).

Figures 3B, 3C:
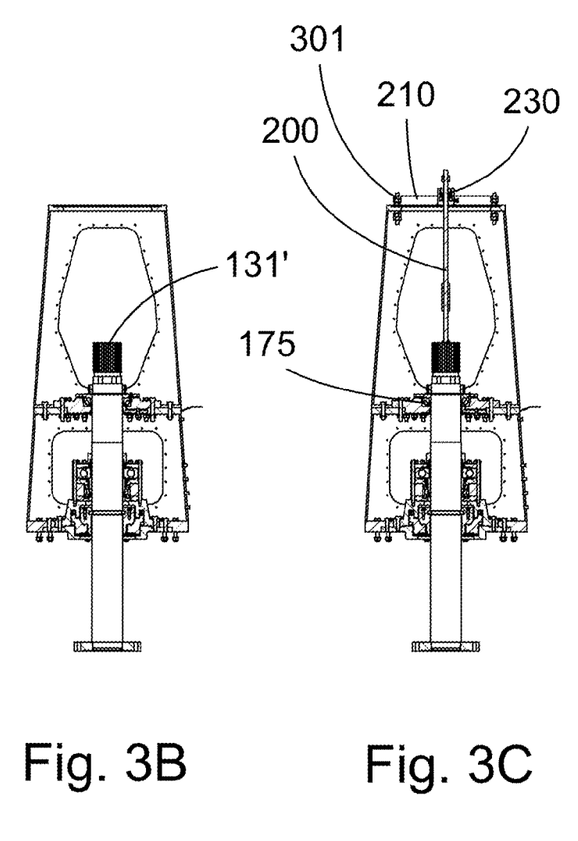

Now the superstructure 170 is provided with the support bar 210, the hydraulic jack 230 and the device 200 (FIG. 3C). The support bar 210 is bolted to the superstructure 170 using bolts 301.

FIG. 3D through FIG. 3I show the remainder of the steps for preparing the crystallizer 100 for the operation.

Figure 3D:
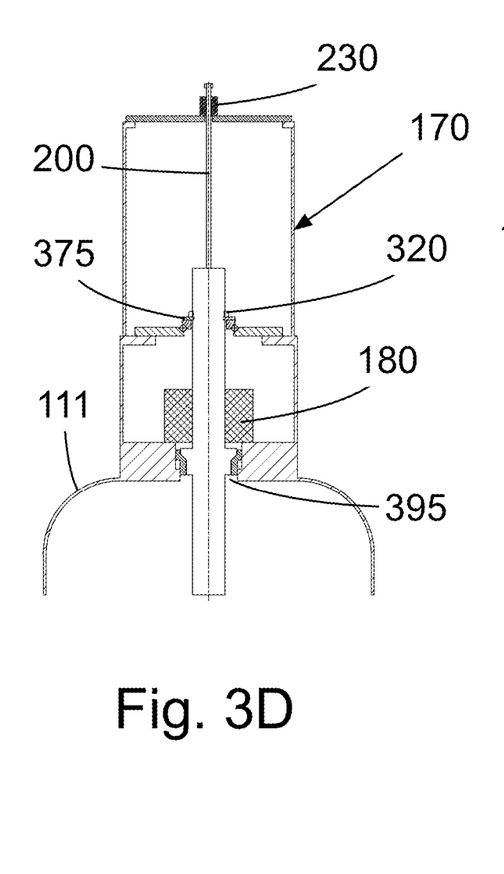

FIG. 3D corresponds to FIG. 3C. It depicts the seat 195 comprising recess 196 for receiving the tapered element 190 provided on the top shaft section 131' and a through-hole 395 for the rotor shaft 131. In use, the outer surface of the tapered element 190 and the inner surface of the recess 196 are not in contact. The weight of the rotor 130 is born by the superstructure 170 via the bearing 175. Two ring halves 375 are sandwiched between a locking nut 320 and the bearing. The top shaft section 131' has a circumferential groove 331 for receiving the inner edges of the ring halves 375.

Figure 3E:
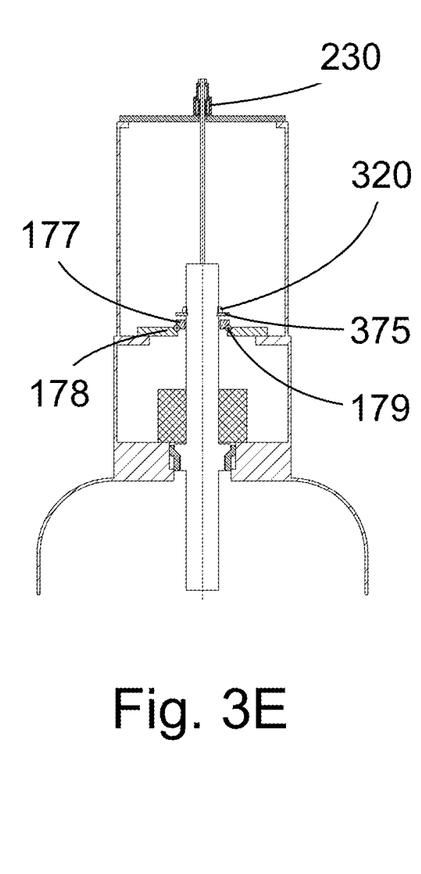
Figure 3F:
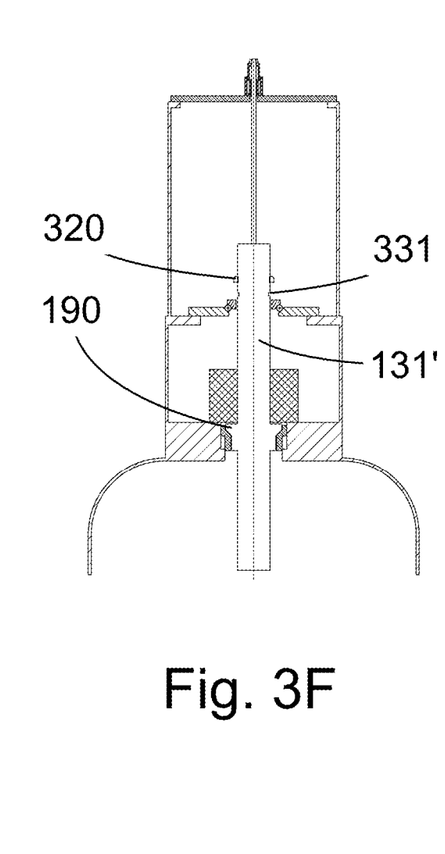

After lifting the rotor 130 using the hydraulic jack 230, the locking nut 320 is rotated, moving it upwards (FIG. 3E) over 15 mm. This allows the ring halves 375 to be removed (FIG. 3F).

Figure 3G:
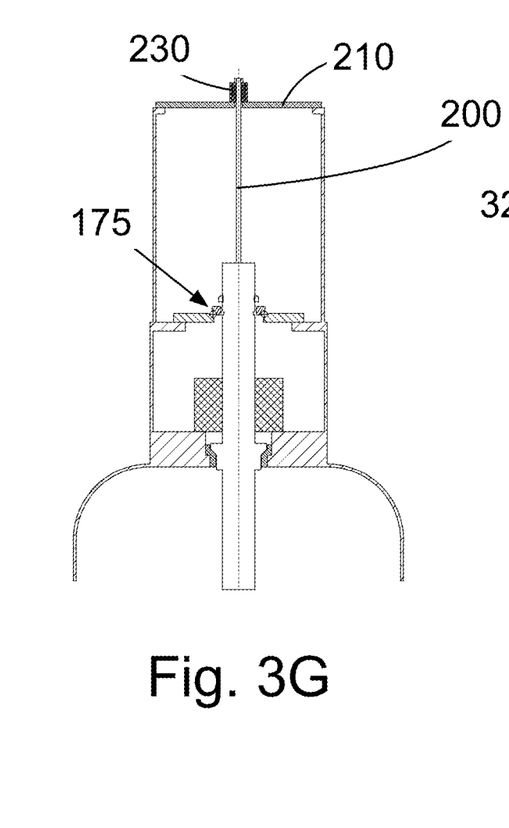

Now the rotor 130 can be lowered through the bearing 175 until the tapered element 190 rests in the recess 196 of the seat 195 (FIG. 3G).

Figure 3H:
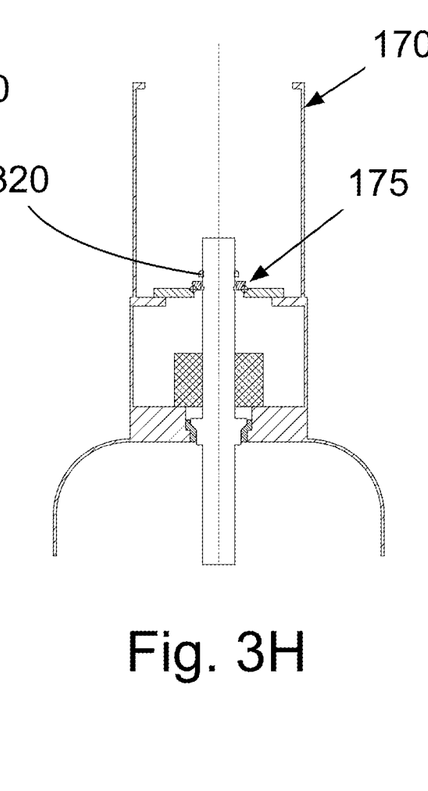
Figure 3I:
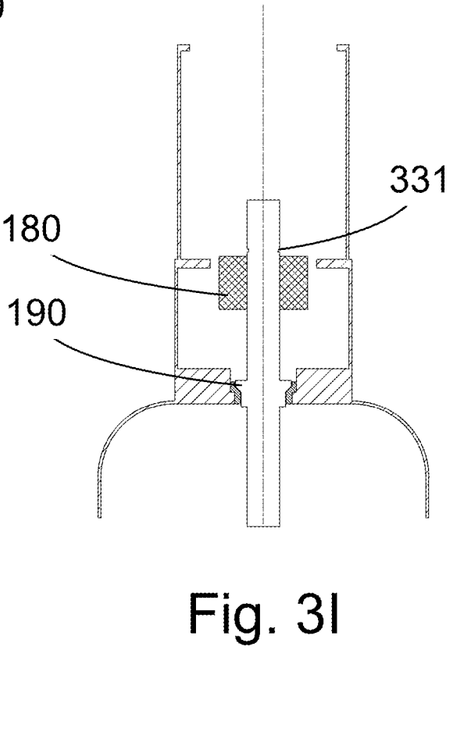

This allows the the device 200, hydraulic jack 230, the support bar 210 to be removed (FIG. 3H), in case the operation requires this. For example, the bearing 175 may be removed, as well as the seal 180 for example for replacement or cleaning thereof as the operation to be performed. The circumferentially extending continuous contact area of the recess 196 and the outer surface of the tapered element 190 acts as a seal, providing a barrier between the lumen 114 and the outside environment of the vessel 110.

Figure 4:
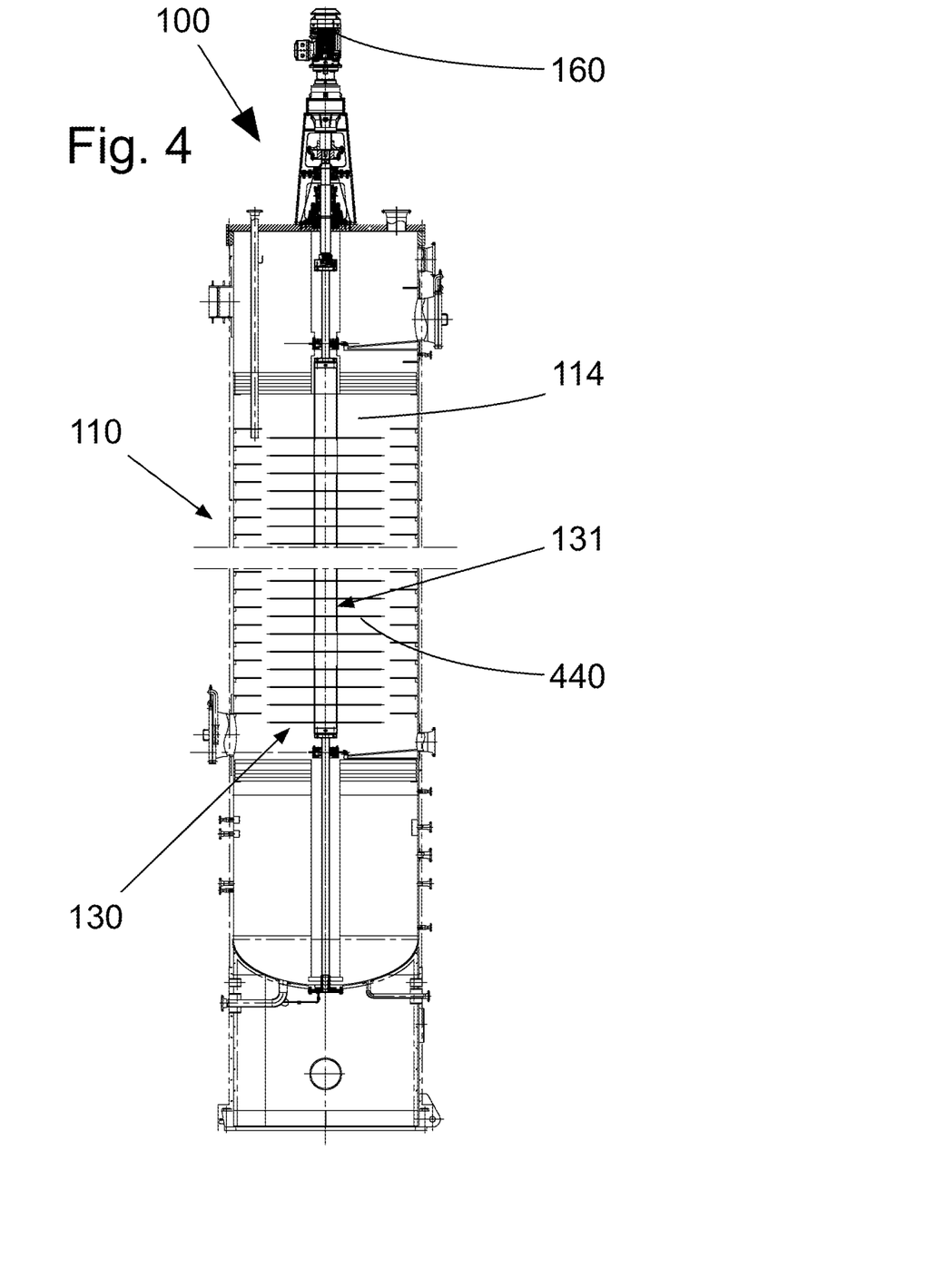
FIG. 4 shows a cross-sectional view of an alternative vessel assembly.

FIG. 4 shows a cross-sectional view of an alternative vessel assembly, that is an Rotating Disc Contactor (RDC) vessel 400, wherein the rotor element 140 is a disc 440.

The invention claimed is:

1. A method of performing an operation on a vessel assembly, said vessel assembly comprising
 a vessel, said vessel comprising a top wall, a bottom wall and an upright wall extending from the bottom wall to the top wall, said top wall, bottom wall and upright wall defining a lumen,
 a superstructure on top of the vessel, said superstructure comprising
 a bearing, said bearing comprising an upper race member, a lower race member and roller bodies between said upper race member and said lower race member, said lower race member being attached to the superstructure, and
 a locking nut for locking the bearing, said locking nut comprising an inner thread,
 a rotor, said rotor comprising
 an upright, rotatable shaft, said shaft comprising i) a top shaft section extending above the top wall and ii) a bottom shaft section in said lumen,
 said top shaft section being provided with said upper race member, allowing the rotor to rotate along a shaft axis of the upright, rotatable shaft in line with the axis of rotation of the bearing, and
 said top shaft section comprising an outer thread for engaging the inner thread of the locking nut to lock the upper race member at a desired location on the top shaft section;
 and
 a plurality of rotor elements attached to said bottom shaft section;
 wherein the rotor is stopped and the operation is performed;
 characterized in that
 the top shaft section comprises at a location above the upper race member a first member chosen from a male member and a female member for engaging a device, said device having
 a top end, and
 a bottom end, said bottom end comprising a complementary second member for engaging the top shaft section, said complementary second member being chosen from a female member and a male member;
 wherein
 the device is connected to the top shaft section of the shaft,
 the rotor is lifted by lifting the shaft at its top end section using the device, and
 the locking nut is rotated upwardly along the top shaft section of the rotor, following which the operation is performed.

2. The method according to claim 1, wherein the rotor comprises an element independently chosen from a recess and a protrusion located below the lower race member; wherein after rotating the locking nut over at least part of the thread upwards, the rotor is lowered and stabilized at a given height using said element.

3. The method according to claim 2, wherein the vessel comprises a seal sealing against the top shaft section, said seal being located above the element.

4. The method according to claim 2, wherein the element is a tapered body tapering away from top end of the top shaft section, said tapered body having a central axis coinciding with the central axis of the shaft, and the vessel comprises a seat for receiving said tapered body, said seat having a central through-opening for the rotatable shaft.

5. The method according to claim 4, wherein when in contact, the seat and the tapered body are in an uninterrupted contact in the rotational direction of the rotor.

6. The method according to claim 1, wherein the device is lifted hydraulically.

7. The method according to claim 1, wherein the superstructure provides a mount for a motor, said motor being a motor for rotating the rotor, wherein before the device is connected to the top shaft section the motor is removed, and the device is attached to the shaft and a hydraulic actuator for lifting the rotor hydraulically is mounted to the superstructure.

8. The method according to claim 7, wherein after removal of the motor from the mount, a support is mounted to the mount and the device is attached to the shaft using the support.

9. The method according to claim 1, wherein the first member of the top shaft section and the complementary second member of the device are threaded members.

10. A vessel assembly, said vessel assembly comprising
a vessel, said vessel comprising a top wall, a bottom wall and an upright wall extending from the bottom wall to the top wall, said top wall, bottom wall and upright wall defining a lumen,
a superstructure on top of the vessel, said superstructure comprising
a bearing, said bearing comprising an upper race member, a lower race member and roller bodies between said upper race member and said lower race member, said lower race member being attached to the superstructure, and
a locking nut for locking the bearing, said locking nut comprising an inner thread,
a rotor, said rotor comprising
an upright, rotatable shaft, said shaft comprising i) a top shaft section extending above the top wall and ii) a bottom shaft section in said lumen,
said top shaft section being provided with said upper race member, allowing the rotor to rotate along a shaft axis of the upright, rotatable shaft in line with the axis of rotation of the bearing, and
said top shaft section comprising an outer thread for engaging the inner thread of the locking nut to lock the upper race member at a desired location on the top shaft section;
and
a plurality of rotor elements attached to said bottom shaft section;
characterized in that the rotor comprises an element located below the lower race member, wherein the element is a tapered body tapering away from the top end of the top shaft section, said tapered body having a central axis coinciding with the central axis of the shaft, and the vessel comprises a seat for receiving said tapered body, said seat having a central through-opening for the rotatable shaft.

11. The vessel assembly according to claim 10, wherein when in contact, the seat and the tapered body are in an uninterrupted contact over the circumference of the tapered body.

* * * * *